No. 793,365. PATENTED JUNE 27, 1905.
J. H. FOGLE.
INSECT GATHERING MACHINE.
APPLICATION FILED AUG. 19, 1904.
2 SHEETS—SHEET 2.
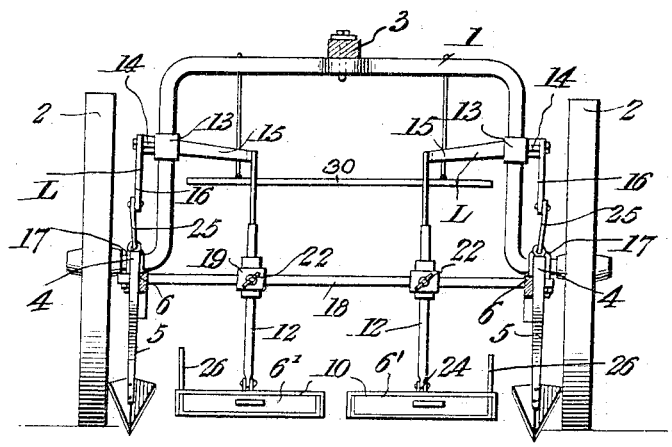
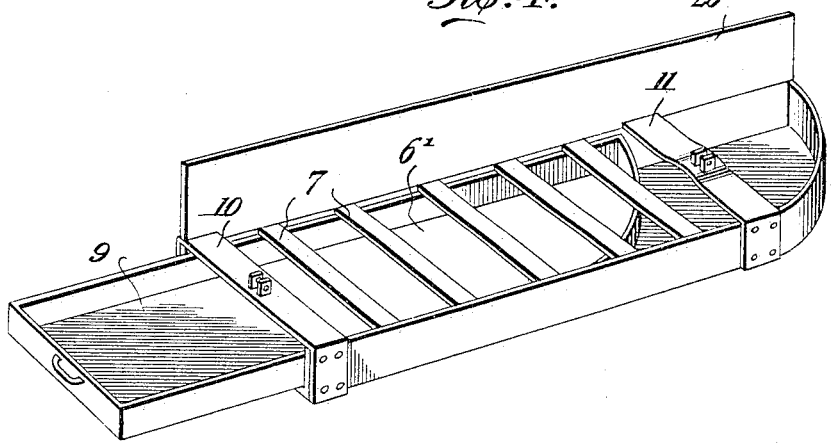
Witnesses
James H. Fogle, Inventor
by C. A. Snow & Co.
Attorneys No. 793,365.

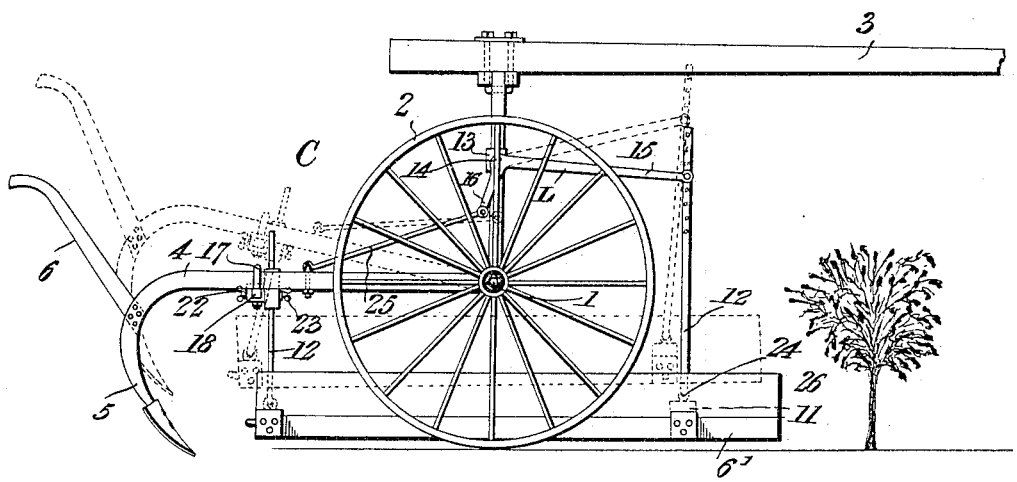
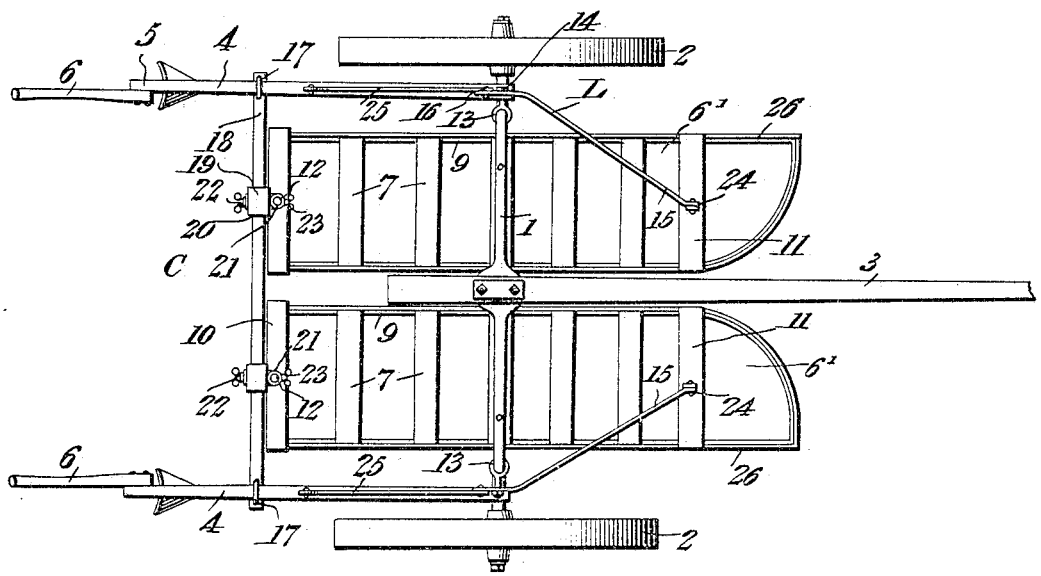

Patented June 27, 1905.

UNITED STATES PATENT OFFICE.

JAMES HENRY FOGLE, OF DELHI, TEXAS.

INSECT-GATHERING MACHINE.

SPECIFICATION forming part of Letters Patent No. 793,365, dated June 27, 1905.

Application filed August 19, 1904. Serial No. 221,420.

*To all whom it may concern:*

Be it known that I, JAMES HENRY FOGLE, a citizen of the United States, residing at Delhi, in the county of Caldwell and State of Texas, have invented a new and useful Insect-Gathering Machine, of which the following is a specification.

This invention relates to that class of devices which are used for catching and destroying harmful insects, such as boll-weevils and the like; and it has for its object to provide a device of this class which shall possess superior advantages in point of simplicity, durability, and general efficiency.

With these ends in view the invention consists in the improved construction and novel arrangement and combination of parts, which will be hereinafter fully described, and particularly pointed out in the claims.

In the accompanying drawings has been illustrated a simple and preferred form of embodiment of the invention, it being, however, understood that no limitation is necessarily made to the precise structural details therein exhibited, but that the right is reserved to any changes, alterations, and modifications which come fairly within the scope of the invention and to which recourse may be had without departing from the spirit or sacrificing the advantages of the same.

In said drawings, Figure 1 is a side elevation of an insect-gathering machine constructed in accordance with the principles of the invention. Fig. 2 is a top plan view of the same. Fig. 3 is a rear elevation. Fig. 4 is a perspective detail view, on an enlarged scale, of one of the gathering-pans detached.

Corresponding parts in the several figures are indicated by similar characters of reference.

The improved device which is the subject of my invention is preferably attached for operation to an ordinary wheel-cultivator, which in the accompanying drawings is designated C, 1 representing the axle, 2 2 the wheels, 3 the tongue, and 4 4 the cultivator-beams, all of which may be of any well-known and approved construction, the beams being provided in the usual manner with plow-carrying standards 5 and with handles 6, whereby they may be conveniently manipulated.

6' 6' designate two flat elongated pans, which are adapted to be disposed adjacent to each other a sufficient distance apart to admit of the passage between them of the stems or stalks of the plants that are to be operated upon. Said pans are rounded at their front ends from their outer in the direction of their inner sides, so that when the pans are placed together for operation the plants which are to be operated upon will readily pass in between the same. Each of these pans is provided with a plurality of transverse slats 7, and each of said pans contains a closely-fitting drawer 9, insertible from the rear end and confined between the sides and bottoms of the pans and the transverse slats, which latter extend across the open drawers. It is obvious that the pans will be constructed with open rear ends in order to admit of the insertion and removal of the drawers 9. The latter are adapted to contain fluid, such as crude oil, which is not only destructive to insect life, but which also will serve to prevent insects, larvæ, and the like which drop into the drawers from escaping. The cross-slats 7 of the respective pans may be comparatively frail; but each of said pans is provided with a pair of cross-braces 10 and 11, located, respectively, between the rear and front ends thereof, each of said braces being provided with an upright 12.

The means for attaching the twin pans just described for operation to a wheel-cultivator includes a pair of collars 13, clamped upon the vertical members of the arched axle, each of said collars being provided with an outwardly-extending arm 14, upon which is pivotally mounted a rocking member or bell-crank lever L, having a forwardly-extending long arm 15 and a downwardly-extending short arm 16. The lever-arms 16 are connected with the cultivator-beams by means of rods 25.

Connected with the cultivator-beams 4 4 by means of clips or clamps 17 is a cross-bar 18, carrying a pair of cuffs 19, each consisting of a plug having perforations 20 and 21 at right angles to each other, the perforations 20 serving to engage the rod 18, upon which the said cuffs are secured by means of set-screws 22. The perforations 21 are for the reception of the uprights 12, rising from the cross-braces 10 at the rear ends of the pans, said uprights being retained adjustably in said perforations by means of set-screws 23. The uprights 12, rising from the cross-bars 11 at the front ends of the pans, are connected adjustably with the long arms 15 of the bell-crank levers L by means of ears or bolts 24, for the passage of which suitable perforations are provided.

Suitably suspended from the arched axle 1 of the cultivator is a bar 30, adapted to contact with the tops of the plants, which are thereby shaken and agitated, thus causing the insects, together with the infested squares, loose leaves, and the like, to be knocked off the plants and into the pans of the device.

The operation and advantages of this invention will be readily understood from the foregoing description, taken in connection with the drawings hereto annexed.

It will be seen that this improved insect-catching device is capable of being readily attached to or connected with any wheel-cultivator of ordinary construction. When the cultivator is drawn over the field in the act of cultivating the plants, the stems or stalks of the latter will pass between the pans, and the plants being agitated by contact with the knocker-bar 30 and other parts of the device the insects, larvæ, infested leaves, and the like will drop between the slats 7 into the drawers in which liquid has been placed, as aforesaid. When the drawers have been filled, they may be readily removed and fresh ones placed in position without making it necessary to stop for the purpose of cleaning out the pans. The latter, as will be seen, are capable of adjustment vertically, and the rear ends of said pans may likewise be adjusted laterally upon the supporting-rod 18. When—as for example, at the end of a row—the cultivator-beams are raised and supported in an elevated position while the machine is being turned, the pans will likewise be elevated, the connecting-rods 25 serving to push the short arms of the bell-crank levers L in a forward direction, thus elevating the front ends of the long arms 15, from which the front ends of the pans are suspended, while the rear ends of the pans are naturally elevated along with the cultivator-beams from which they are suspended. The pivotal connection of the front rod 12 with the lever-arm 15 permits the pans to swing or sway during the operation of the device in such a manner as to impinge upon the plants and assist in shaking the latter sufficiently to cause the insects, larvæ, &c., to drop into the pans. It is preferred that the pans be provided at their outer edges with upstanding flanges 26 to prevent insects from escaping over said outer edges.

It is not absolutely necessary that the insect-catching device be used in connection with a cultivator, inasmuch as it may without departing from the spirit of the invention be connected with a simple wheel-supported frame of suitable construction.

Having thus described the invention, what is claimed is—

1. In a device of the class described, the combination of a wheeled frame having an arched axle, bell-crank levers pivoted upon the vertical members of said axle, beams connected hingedly with said axle, insect-gathering pans, uprights connecting the front ends of the latter with the forward-extending arms of the bell-crank levers, and means for suspending the rear ends of said pans from the beams.

2. The combination with a wheel-cultivator having an arched axle, of bell-crank levers pivoted upon the vertical members of the axle of said cultivator, a transverse rod connected with the cultivator-beams, cuffs adjustable upon said transverse rod, insect-gathering pans, means for connecting the front ends of said pans adjustably with the forward-projecting arms of the bell-crank levers, means for connecting the rear ends of said pans adjustably with the cuffs, and rods connecting the cultivator-beams with the downward-projecting arms of the bell-crank levers.

3. In a device of the class described, a wheel-cultivator having an arched axle, collars supported upon the vertical members of said axle and having outwardly-extending arms, bell-crank levers pivotally engaging said arms, rods connecting the downwardly-extending arms of said bell-cranks with the cultivator-beams, transverse rods connecting said beams, cuffs adjustable upon said transverse rods, insect-gathering pans, and suspending means adjustably connecting the front ends of said pans with the forward-extending arms of the bell-crank levers and the rear ends of said pans with the cuffs adjustable upon the transverse rod connecting the cultivator-beams.

In testimony that I claim the foregoing as my own I have hereto affixed my signature in the presence of two witnesses.

JAMES HENRY FOGLE.

Witnesses:
  LEX MAGEE,
  CAREY SMITH.